M. C. STEARNS.
SPOON HOLDER.
APPLICATION FILED SEPT. 20, 1919.
1,369,945.
Patented Mar. 1, 1921.
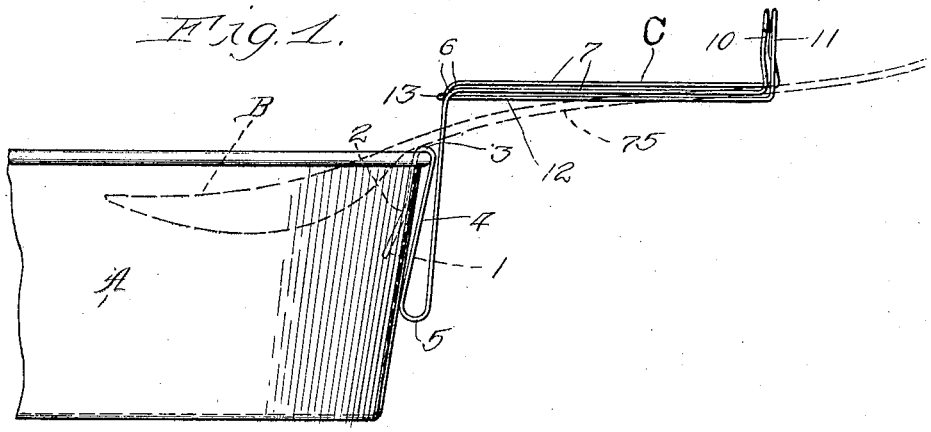
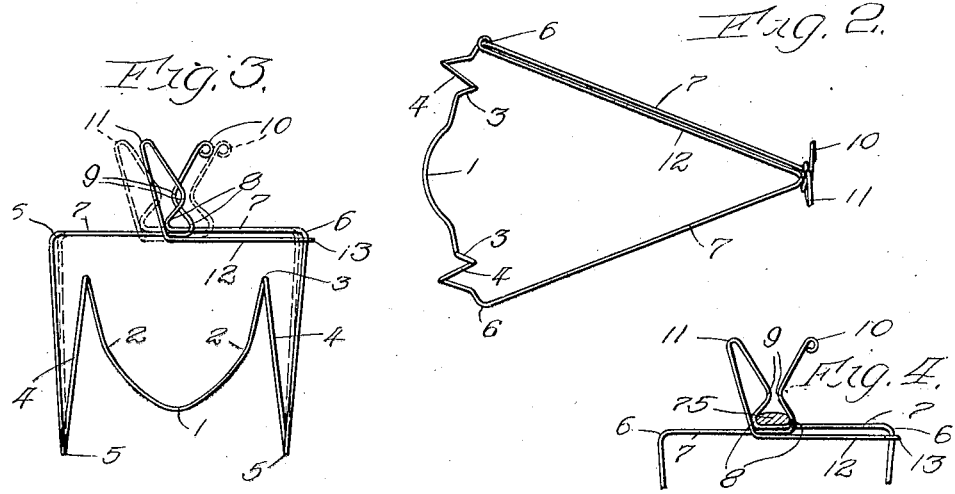
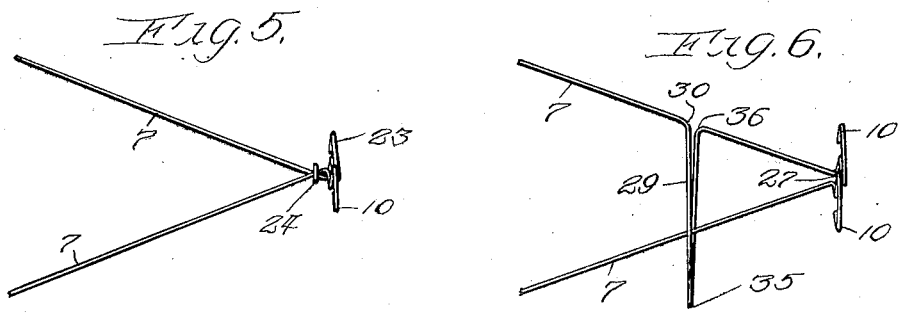
Witness:
R. L. Farrington
Inventor,
Marcus C. Stearns.
By Marins A. Hischl.
Atty.

UNITED STATES PATENT OFFICE.

MARCUS C. STEARNS, OF CHICAGO, ILLINOIS.

SPOON-HOLDER.

1,369,945.  Specification of Letters Patent.  Patented Mar. 1, 1921.

Application filed September 20, 1919. Serial No. 325,162.

*To all whom it may concern:*

Be it known that I, MARCUS C. STEARNS, a citizen of the United States, residing in Chicago, in the county of Cook, in the State of Illinois, have invented new and useful Improvements in Spoon-Holders, of which the following is a specification.

This invention comprises a device formed of wire or other suitable material adapted to be attached to a cooking vessel to act as a support for a spoon used to stir the contents of the vessel while cooking.

My improved device is so designed that it can be cheaply manufactured and is so constructed that it can be quickly and easily attached to a cooking vessel. My improved spoon holder is also so made that it may be easily operated by any person not skilled in mechanics. An additional feature of my improved device is the fact that it has a spring clamp to engage the handle of the spoon so that it will grip handles of different sizes.

The features above referred to and others will be made more clear in the following specification, of which the accompanying drawings form a part, and in which:

Figure 1, is a view in side elevation of a portion of a cooking vessel with my improved spoon holder attached and supporting a spoon.

Fig. 2, is a top plan view of the spoon holder removed from the cooking vessel.

Fig. 3, is a view in end elevation of the device.

Fig. 4, is a fragmentary view in end elevation showing the handle of a spoon clamped by the device.

Fig. 5, is a fragmentary top plan view of a modified form of the device.

Fig. 6, is a fragmentary top plan view of a modified form of the device.

As shown in said drawings A indicates a cooking vessel and B indicates a spoon. The spoon holder is indicated by C.

The spoon holder is preferably made of a single length of spring wire bent at 1 to form a loop designed to project downwardly into and adjacent the inside surface of the side of a cooking vessel. From the bend 1, the two ends of the wire are led upwardly, and divergently and bent slightly at 2, 2 as shown in Fig. 1. From the bends 2, 2 they are led upwardly farther, still diverging but not to such an extent, and then bent downwardly as indicated at 3, 3. The bends 3, 3 are adapted to lie over the edge of the cooking vessel as shown in Fig. 1. From the bends 3, 3 the wires are led downwardly, diverging slightly to form the two straight sections 4, 4. The plane in which the sections 4, 4 of the wire lie intersects, below the bends 3, 3 the plane in which the two sections of wire between the bends 2 and 3 lie. It will be noticed that by means of this construction, when the loop 1 is forced down on the inner side of the edge of the cooking vessel, and the sections of wire 4, 4 on the outside, that the bends 3, 3 will have to be sprung open to a slight extent, so that the wire will firmly clamp the side of the vessel.

At the lower ends of the sections 4, 4 the two wires are again bent upwardly and divergently at 5, 5 and led upwardly to points slightly above the edge of the cooking vessel and there bent at 6, 6 to extend horizontally away from the cooking vessel and converging toward each other as indicated by reference numerals 7, 7. The two sections of wire 7, 7 are continued until they cross and just after crossing the two ends are bent upwardly at 8, 8 and toward each other and continued a short distance and there bent away from each other in order to form the two projecting and overlapping tongues 9, 9. From one of the tongues 9 the wire is continued upwardly a short distance and bent around to form the small eye 10. From the other tongue 9 the wire is continued upwardly to a point the same height as the eye 10 and then bent sharply downwardly at 11 and brought down until it lies adjacent the bend 8 and from this point bent in order to lie parallel to and below the straight section 7. This section of the wire lying below and parallel to said straight section 7 is indicated by the reference numeral 12. This section of wire 12 is continued until it meets the wire below the bend 6 where it is bent around such wire and fastened as indicated by 13.

It will be noted that the two straight sections of wire 12 and 7 form a slot or guide. The straight section 7 on the opposite wire extends through such slot or guide as shown in Fig. 3.

It will be noted from the construction as described above that the two tongues 9, 9 may be sprung apart as indicated by the dotted lines in Fig. 3. The wire is so bent, however, that they normally will lie in the position indicated by the solid lines in Fig.

3. As the tongues 9, 9 are so sprung apart the straight section of wire 7 to the left, as viewed in Fig. 3 will slide in the slot or guide formed by the other straight section of wire 7 and the section 12 lying below and parallel to it. By means of this guide or slot the two sections of wire 7, 7 are maintained in two parallel planes as the tongues 9, 9 separate and approach each other.

In the operation of the device the spoon holder is attached to a vessel as explained above and as shown in Fig. 1. A spoon is then placed with the bowl over the vessel as shown by the dotted lines in Fig. 1. The two tongues 9, 9 of the wire are then sprung slightly apart as shown by the dotted lines in Fig. 3 and the handle of the spoon is placed between the two bends 8, 8. The wire will then tend to assume the position shown in the solid lines in Fig. 3 with the result that the handle of the spoon will be securely clamped between the two ends 8, 8, as shown in Fig. 4, the handle of the spoon being indicated by 75. The spoon will then be held firmly in position as shown in Fig. 1. It will be noted that the two wires from the two tongues 9, 9 are bent away from each other upwardly. Owing to this construction it will not be necessary in all cases to separate the two tongues 9, 9 by grasping the wire; but the spoon handle may simply be forced downwardly against the two diverging portions of the wire lying above the tongues 9, 9 with the result that this downward pressure of the spoon handle will itself cause the two tongues 9, 9 to separate so that the handle will be pressed down to a position below such tongues whereupon the two tongues will spring together causing the spoon handle to be securely clamped between the bends 8, 8 below the tongues 9, 9.

In Fig. 5 I have shown a modified form of the device. As here shown the two straight sections of wire 7, 7 are crossed the same as in the preferred form of the device and the bends 8, 8 and tongues 9, 9 are formed in the same way. One of the wires from the bend 9 is led upwardly and formed into an eye 10, the same as shown in the preferred form and the other wire, instead of being formed with the bend 11 and then carried down and led below and parallel to the straight section 7, is formed into another eye 23 the same as the eye 10. Where the two wires 7, 7 cross a small ring 24 is provided through which both of the wires extend. The function of this ring is to keep the two wires 7, 7 in parallel planes as they move when the tongues 9, 9 are opened and closed. During this movement the ring 24 slides back and forth on the wires. The function of this ring 24 on the form shown in Fig. 5 is the same as the function of the slot or guide formed by the two parallel wires 7 and 12 as shown in the preferred form of the device in Fig. 3. In other words, the construction as shown in Fig. 5 is the same as that shown in Fig. 3 except that the ring 24 is provided instead of carrying one of the wires downward from the bend 11 to form the section of wire 12 lying below and parallel to the section 7.

In Fig. 6 I have shown another modified form of the device. In this form of the device the two wires 7, 7 do not cross but meet at the point 27. From the point 27 each wire is led upwardly to form the bends 8, 8; tongues 9, 9; and eyes similar to those shown in Fig. 3, with one turned in the opposite direction. From the bends 9, 9 the wire is led upwardly to form the two eyes 10, 10. The operation of the device in this form is substantially the same as in Fig. 3. It is apparent, however, that since the two wires 7, 7 do not cross and since the tongues 9, 9 and the bends 8, 8 are turned in the opposite directions that the clamping of the spoon handle is effected by separating the tongues which will cause the ends of the wires 7, 7 to separate. In this form of the device one of the wires 7 is provided with a horizontally projecting link 29 formed by bending the wire 7 at the point 30 leading it horizontally to the bend 35 and then bending it sharply and leading it back parallel to itself to the bend 36 which lies adjacent the bend 30 and then continuing it to form the remaining portion of the wire 7. The two wires of this link 29 lie in a vertical plane a short distance apart in order to form a slot or guide through which the other wire 7 passes. The function of this slot or guide is to maintain the two wires 7, 7 in the same plane as the clamping of the spoon handle takes place.

I will be noted that by the use of my improved device a spoon may be held, during the cooking operation, so that the bowl will drip into the cooking vessel and the handle will project to the side of the vessel where it will remain cool.

I claim:

1. A spoon holder formed of one piece of wire bent to provide a middle loop adapted to engage the inner surface of a cooking vessel, and two loops, one formed on each side of the middle loop, adapted for engagement with the outer surface of such cooking vessel, with its ends crossed, and formed into two opposed bends adapted to form a spring engagement with the handle of a spoon, one of said ends being bent back parallel with itself to form a guide for the other end.

2. A spoon holder formed of one piece of wire bent to provide a middle loop adapted to engage the inner surface of a cooking vessel, and two loops, one formed on each side of the middle loop, adapted for engagement with the outer surface of such cooking vessel, with its ends converging from said loops, crossing near their extremities, and formed into two opposed bends adapted to form a spring engagement with the handle of a spoon.

3. A spoon holder formed of one piece of wire bent to provide a middle loop adapted to engage the inner surface of a cooking vessel, and two loops, one formed on each side of the middle loop, adapted for engagement with the outer surface of such cooking vessel, with its ends converging, crossing near their extremities, and provided with opposed bends adapted to form a spring engagement with the handle of a spoon and means for retaining said ends in the same plane as the opposed bends are moved toward and away from each other.

In witness whereof, I have hereunto subscribed my name this 17 day of September, 1919.

MARCUS C. STEARNS.